US010383791B2

(12) United States Patent
Scully, Jr.

(10) Patent No.: US 10,383,791 B2
(45) Date of Patent: Aug. 20, 2019

(54) FLEXIBLE AND CONFORMABLE MEDICAL RESERVOIR TEMPERATURE MONITORING, REGULATION, AND SECURITY DEVICES AND METHODS

(71) Applicant: Thaddeus Medical Systems, Inc., Rochester, NY (US)

(72) Inventor: Stephen Joseph Scully, Jr., Rochester, MN (US)

(73) Assignee: Thaddeus Medical Systems, Inc., Rochester, MN (US)

( * ) Notice: Subject to any disclaimer, the term of this patent is extended or adjusted under 35 U.S.C. 154(b) by 0 days.

(21) Appl. No.: 15/279,704

(22) Filed: Sep. 29, 2016

(65) Prior Publication Data

US 2017/0239139 A1    Aug. 24, 2017

Related U.S. Application Data

(60) Provisional application No. 62/284,483, filed on Oct. 1, 2015.

(51) Int. Cl.
*A61J 1/16* (2006.01)
*H04W 4/20* (2018.01)

(52) U.S. Cl.
CPC ............... *A61J 1/165* (2013.01); *H04W 4/20* (2013.01)

(58) Field of Classification Search
CPC ............ A61J 1/165; H04W 4/20; F28F 27/00
See application file for complete search history.

(56) References Cited

U.S. PATENT DOCUMENTS

| 3,966,578 | A  | * | 6/1976  | Sommer .............. H01C 17/12 204/192.14 |
| 2003/0074903 | A1 | * | 4/2003  | Upadhye ............. A47J 36/2438 62/3.3 |
| 2006/0026971 | A1 | * | 2/2006  | Sharpe ................. G01J 5/0037 62/126 |
| 2008/0140432 | A1 | * | 6/2008  | Fenn .................... G06Q 10/087 705/317 |
| 2009/0157219 | A1 | * | 6/2009  | Parker, Jr. ............ A61M 5/172 700/231 |
| 2009/0230032 | A1 | * | 9/2009  | Flick ....................... A23L 2/50 210/85 |
| 2017/0354190 | A1 |   | 12/2017 | Cauchy |

* cited by examiner

*Primary Examiner* — Larry L Furdge
(74) *Attorney, Agent, or Firm* — Schwegman Lundberg & Woessner, P.A.

(57) ABSTRACT

This document provides devices and methods for monitoring and maintenance of the temperature of medical reservoirs and boxes in a secure fashion that enables for documentation of a chain of custody and history of temperature while in storage or transit. For example, this document provides devices and methods for monitoring the temperature of blood in phlebotomy tubes or boxes of biological products. In some embodiments of the devices and methods, the temperature of the contents of the medical reservoirs are regulated, modulated, and/or maintained by the devices provided herein.

20 Claims, 2 Drawing Sheets

FLEXIBLE AND CONFORMABLE MEDICAL RESERVOIR TEMPERATURE MONITORING, REGULATION, AND SECURITY DEVICES AND METHODS

BACKGROUND

1. Technical Field

This document relates to devices and methods for monitoring and maintaining the temperature of medical reservoirs while maintaining a secure chain of custody and log of sample or product access. For example, this document relates to devices and methods for monitoring and regulating the temperature of blood, cerebrospinal fluid, or bone marrow in tubes or vials, vaccines in ampoules or bottles, and/or biological pharmaceutical products in boxes as well as the presence of it in the device and whether it has been removed.

2. Background Information

The Center for Disease Control reports that $300 million dollars was wasted in 2014 due to the improper storage and regulation of temperature for vaccines. If these vaccines and other biomedical samples (such as bone marrow, cerebrospinal fluid, or blood) as well as biomedical products (such as biological or biosimilar pharmaceutical products) freeze or get too warm, they can be ruined or lose potency and efficacy. In addition many samples need to be kept frozen while in storage and in transit. In addition, when phlebotomy tubes are drawn from patients that contain blood, certain clinical diagnostic tests for cryoglobulinemia or complement deficit mandate that the tubes must be kept at body temperature (37 degrees Celsius) or a life threatening diagnosis can be missed. Consequently, rigorous control of biomedical sample and product storage temperatures, and verification of the temperatures to which blood samples have been exposed is advantageous. In addition, having a more reliable and traceable chain of custody for security purposes to prevent tampering and/or the introduction of counterfeit products for these samples and products is advantageous. In addition, it is advantageous if an electronic log can be kept for temperature deviations, changes in location, and whether the sample or product has been accessed. It is also advantageous if all these separate features could be communicated in real-time to the internet and if all these features could be combined into a small, thin, conformable device to favor space constraints.

SUMMARY

This document provides devices and methods for monitoring and maintaining the temperature of biomedical reservoirs which has the capability to maintain a chain of custody and ensure the security of the sample or product through communications in real-time with the internet. For example, this document provides devices and methods for monitoring and maintaining (or regulating) the temperature of vaccines in ampoules, vials, or bottle, while also tracking location and position of the product. In one example of use, the devices provided herein will track and maintain temperatures to prevent excess temperatures above or below 4 degrees Celsius.

In one implementation, a medical reservoir temperature monitoring and maintenance device includes: a thin and small housing that defines structure for selective coupling to a medical reservoir; a user interface coupled to the housing; and a flexible temperature sensor that can be coupled to the housing. The temperature sensor and pressure sensor is configured and operable to measure temperature of a material within the medical reservoir when the medical reservoir is coupled to the housing, and the pressure sensor to prevent tampering. The user interface includes an alarm functionality for notifying a user that the temperature sensor detected the temperature of the material to be outside of a predetermined range of acceptable temperatures and also if the pressure from stretching of the housing occurs and its contact from the reservoir changes such as when or if the sample or product has been removed from the device.

Such a medical reservoir temperature monitoring and maintenance device may optionally include one or more of the following features. The structure defined by the housing for selective coupling to the medical reservoir may be included by a stretchable elastic and/or conformable plastic that allows for the tube to slip through, or could wrap around a bottle. The structure defined by the housing for selective coupling to the medical reservoir may comprise thin and small elements that are flexible and can be enclosed by a stretchable plastic that is conformable and may stick to the bottle. The medical reservoir may be a vaccine bottle or therapeutic ampoule. The temperature sensor may comprise a micro thermistor, or STT-MTJ sensor that have previously been described under US Patent Pub. #2012/0181651 A1. The user interface may include a small display. The user interface may include one or more electrical buttons. The medical reservoir temperature monitoring and maintenance device may further comprise an electrical connector coupled to the housing. The medical reservoir temperature monitoring and maintenance device may be configured and operable to wirelessly communicate with a separate computer or other device through cellular or satellite or low energy Bluetooth methods. The medical reservoir temperature monitoring and maintenance device may be configured so that it can be resistant to sterilization procedures for reusability, or it could be disposable. The medical reservoir temperature monitoring and maintenance device may further comprise a heating and cooling device (such as a micro Peltier device, or newer classes of thermoelectric-cooling mechanisms based on the adiabatic spin entropy expansion$^i$) coupled to the housing. The cooling and heating device may be configured and operable to heat and cool the material within the medical reservoir when the medical reservoir is coupled to the housing. The data from the temperature sensor and pressure or stretch sensor may be periodically stored in memory that is coupled to the housing. That memory may be periodically communicated to the internet through cellular or satellite communications.

In another implementation, a method for monitoring a temperature of contents of a medical reservoir includes coupling a medical reservoir temperature monitoring device to the medical reservoir; on a periodic time interval basis, storing temperature values from the temperature sensor in memory that is coupled to the housing; and based on the temperature values, providing temperature information via the user interface or wirelessly to a separate unit that records this information on many units. The medical reservoir temperature monitoring device includes: a housing, the housing defining structure for selective coupling to a medical reservoir; a temperature sensor coupled to the housing, pressure and/or stretch sensors 150 coupled to the housing, the temperature sensor being configured and operable to measure temperature of a material within the medical reservoir when the medical reservoir is coupled to the housing; the pressure or stretch sensor 150 being configured and operable to measure the pressure of a material within the housing, when the medical reservoir is coupled to the housing and a user interface coupled to the housing or transmissible to a separate mobile unit, the user interface including an alarm functionality for notifying a user that the temperature sensor detected the temperature of the material to be outside of a predetermined range of acceptable temperatures as well as status of the battery of the device and whether the pressure or stretch sensor has detected a stimulus outside of a predetermined range, or has changed.

Such a method for monitoring a temperature and pressure of contents of a medical reservoir, or the stretching of the housing may optionally include one or more of the following features. The temperature, and/or pressure, and/or stretch information may be connected to a local or remote alarm. The pressure and or stretch information may comprise a local alarm that is audible and visible, and it may also be communicated through the internet to signal the owner as to its status. The time interval may be within a range between about 10 micro-seconds and about 5 minutes. The method may further comprise transmitting the stored temperature and pressure or stretch values to an external computer or device. The transmitting may be performed wirelessly. The user interface may include a display, and temperature values and pressure and stretch values measured by the temperature sensor may be indicated on the display. The method may further comprise heating or cooling, by the medical reservoir temperature monitoring device, the material within the medical reservoir, wherein the heating or cooling is initiated based on the temperature values. The medical reservoir may be a phlebotomy tube, it could also be a box that contains products within it.

Particular embodiments of the subject matter described in this document can be implemented to realize one or more of the following advantages. In some embodiments, the medical reservoir temperature monitoring and maintenance devices provided herein detect and store in memory a real-time and time-based record of the temperature and of the contents (e.g., blood) of a phlebotomy tube, and its presence or absence, attempts to remove the reservoir, and may insure that temperature deviations beyond normal body temperature 37 degrees Celsius are minimal if they occur. Using the temperature record, a clinical pathologist or laboratory healthcare worker can verify that the sample has not reached a temperature that could be detrimental to the sample and ultimately the patient if an incorrect diagnosis is made based on this type of pre-analytical error. In conclusion, patient safety and clinical results can be improved.

In some embodiments, the medical reservoir temperature monitoring and maintenance devices provided herein will provide a visual notification or silent alarm if the sample deviates from an acceptable temperature range. Such notifications or alarms can assist individuals to readily identify samples that may require rejection and an immediate request for a new sample(s) to be drawn, or for additional quarantine or further analysis of that suspect sample if needed or if necessary. In some embodiments, the temperature data will be available for download from the temperature monitoring device to another computing device. Historical data records can thereby be maintained in conjunction with an electronic medical record. In some embodiments, the temperature monitoring devices provided herein are portable and thereby allow portability of the medical reservoirs while continuing to monitor the temperature of the contents. In some embodiments, the medical reservoir temperature monitoring devices provided herein are reusable, and in particular embodiments the devices can be decontaminated by sterilization, and thus reused.

Unless otherwise defined, all technical and scientific terms used herein have the same meaning as commonly understood by one of ordinary skill in the art to which this invention pertains. Although methods and materials similar or equivalent to those described herein can be used to practice the invention, suitable methods and materials are described herein. All publications, patent applications, patents, and other references mentioned herein are incorporated by reference in their entirety. In case of conflict, the present specification, including definitions, will control. In addition, the materials, methods, and examples are illustrative only and not intended to be limiting.

The details of one or more embodiments of the invention are set forth in the accompanying drawings and the description herein. Other features, objects, and advantages of the invention will be apparent from the description and drawings, and from the claims.

DESCRIPTION OF THE DRAWINGS

Like reference numbers represent corresponding parts throughout.

DETAILED DESCRIPTION

This document provides devices and methods for monitoring and maintenance of the temperature of medical reservoirs while maintaining a chain of custody. For example, in one non-limiting example this document provides devices and methods for monitoring the temperature of blood in phlebotomy tubes. The devices, such as stretch sensor 150, can also be used, for example, for measuring and detecting stretch or pressure that may be caused from moving the tube out of or into the device. Further, the device can be used for measuring/detecting every time the sample or product is accessed. Other uses and implementations of the inventive concepts provided herein will be readily apparent to one of skill in the art.

Figure 1:
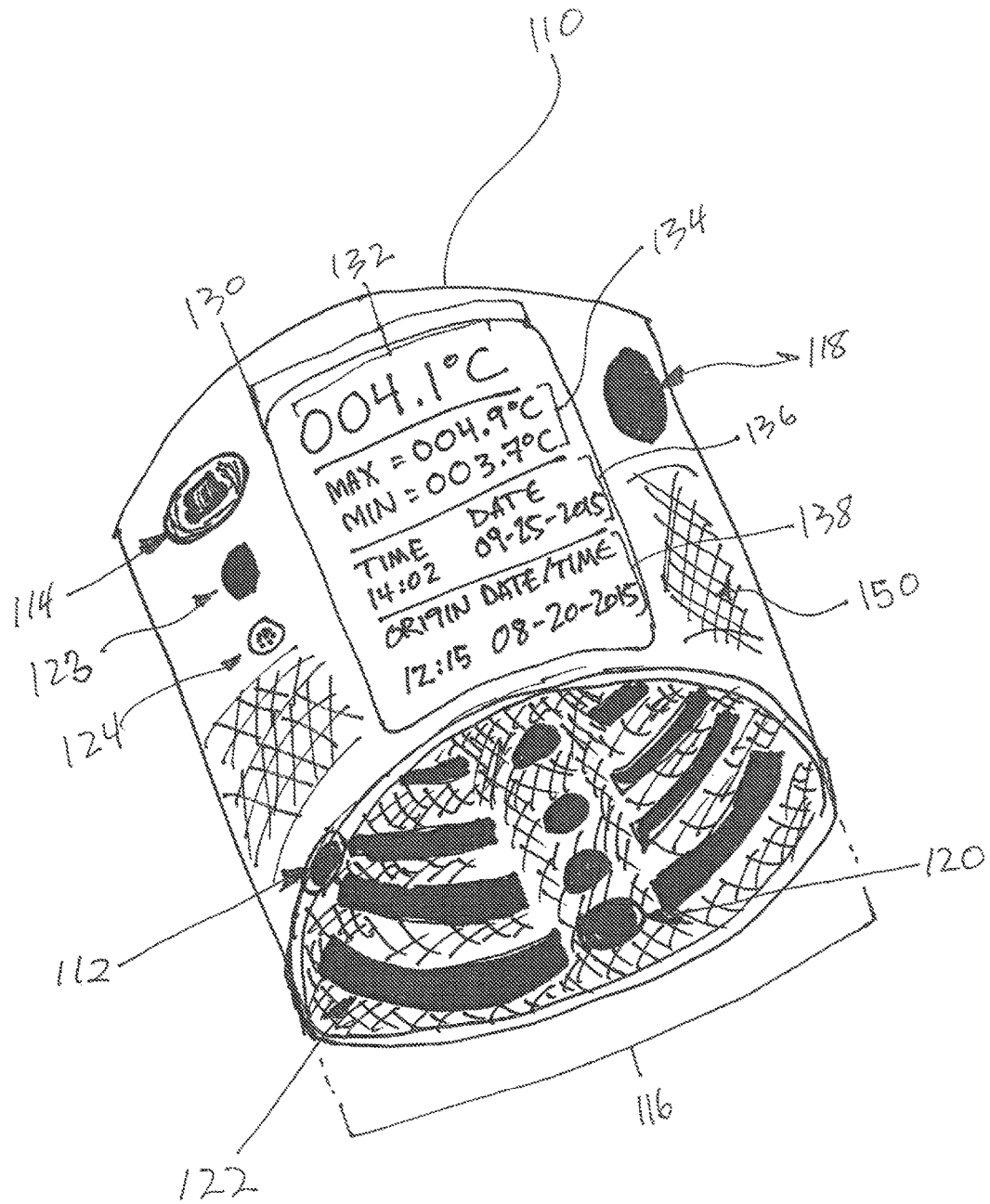
FIG. 1 is a perspective view of an example medical reservoir temperature monitoring and maintenance device with an expanded orifice in accordance with some embodiments.

Referring to FIG. 1, an example medical reservoir temperature monitoring and maintenance device 100 includes a housing 110 that defines an opening 116 that is expandable. As described further below, opening 116 is configured to receive a medical reservoir therein. For example, in the depicted embodiment opening 116 is configured to receive a cylindrical sample container such as a phlebotomy tube therein and can stretch to accommodate such an item FIGS. 2 & 3.

While opening 116 of the depicted embodiment defines a circular cross-sectional shape that can be slid onto a cylindrical sample container, in some embodiments opening 116 is configured differently. For example, in some embodiments opening 116 is thicker. In some such embodiments, housing 110 can be take the shape of a ball. In other embodiments, housing 110 can be a thin sheet of plastic that has the thin sensors and microchip within it. In some embodiments, the axial length of housing 110 is longer or shorter than represented in FIG. 1. For example, in some embodiments housing 110 is longer so as to cover a majority of the exterior surface areas of a sample container such as a phlebotomy tube.

While opening 116 of the depicted embodiment defines a circular cross-sectional shape it should be understood that the housing may be a piece of tape or plastic that can stick to the tube and may only take up a small area of the sample or product.

While in some embodiments, housing 110 substantially surrounds a sample container, it should be understood that some embodiments do not fully surround a container. In fact, contact may only be necessary between housing 110 and a sample container at a single point. However, in some embodiments medical reservoir temperature monitoring and maintenance device 100 is insulated and fits tightly, like a glove might around a finger, around the phlebotomy tube (or other sample or product reservoir). This may save energy, battery life, and prolong the use of the device for more extended periods if needed.

In some embodiments, temperature monitoring device 100 includes a connector 112 coupled to housing 110. Connector 112 can be a computer bus and power connector. Connector 112 can be used, as described further below, for functions such as data transmission, on-board battery charging, input of user settings (e.g., using a keyboard, etc.) for configuration of temperature monitoring device 100, and the like, and combinations thereof. In some embodiments, no such connector 112 is included, and these procedures could be performed wirelessly and/or through an electro-magnet 118 or coils.

In some embodiments, there may be an additional temperature probe that determines the outside/exterior temperature not directly attached to the tube, so that the device 100 can anticipate if it will need to prepare to heat or cool the sample.

Coupled to flexible housing 110 is one or more temperature sensors 120. In the depicted embodiment, temperature sensor 120 is included in a series along the interior of the housing, but in some embodiments only one is needed. Temperature sensor 120 is disposed on housing 110 in a manner to facilitate contact or close proximity between temperature sensor 120 and a medical sample reservoir that is positionable within opening 116. For example, in the depicted embodiment temperature sensor 120 is disposed on an inner diameter of opening 116. It is essential that the temperature sensor be flexible so that tubes and reservoirs or containers such as boxes of various sizes are always in contact with the sensor.

In some embodiments, temperature sensor 120 is a thermistor that is used to detect the surface temperature of a sample reservoir. A thermistor is a type of resistor whose resistance varies significantly with temperature, more so than in standard resistors. In some embodiments, the thermistor is within a bridge circuit of temperature monitoring device 100. In some embodiments, other types of temperature detection devices are used for temperature sensor 120. For example, such temperature detection devices can include, but are not limited to, thermocouples, infrared sensors, bimetallic devices, and the like, and combinations thereof.

Temperature sensor 120 can periodically measure the temperature of the sample reservoir disposed in opening 116. The measured temperature values, and/or trends over time of such values, can be stored in an on-board memory of temperature monitoring device 100 may be determined to be below or above a threshold level that is indicative of a potential for adverse effects to the sample. For example, in some implementations temperature sensor 120 may detect and send to memory a temperature reading about every second, about every 5 seconds, about every 10 seconds, about every 30 seconds, about every 1 minute, about every 2 minutes, about every 5 minutes, about every 10 minutes, or less frequently than about every 10 minutes depending on changes in temperature to outside sensor 123. In some embodiments, the time interval is adjustable and selectable by the user of temperature monitoring device 100.

In some embodiments, temperature monitoring device 100 can be configured to initiate an alarm to notify medical personnel when temperature sensor 120 detects that the temperature of a sample material in a reservoir is below a minimum temperature value or above a maximum temperature value for over a threshold period of time. Such an alarm may be audible, visual, and combinations thereof. In some embodiments, an alarm signal is transmitted from temperature monitoring device 100 to another computing device or system. In some such embodiments, transmission of the alarm signal can be performed wirelessly, or over a hardwire connection (e.g., by a cable using connector 112), between temperature monitoring device 100 and the other computing device or system.

Temperature monitoring device 100 can include one or more on-board processors (not visible) within housing 110. The processor(s) are suitable for the execution of a computer program and can be, by way of example, both general and special purpose microprocessors, and any one or more processors of any kind of digital computer. The processor(s) can execute instructions, including the executable instructions that are stored in memory of temperature monitoring device 100. The processor(s) may be implemented as a chipset of chips that include separate and multiple analog and digital processors. The processor(s) may provide, for example, for coordination of the other components of temperature monitoring device 100, such as control of the user interface, applications or configurations run by temperature monitoring device 100, and communications via temperature monitoring device 100.

Temperature monitoring device 100 can include on-board memory (not visible) for storing information within temperature monitoring device 100, including, but not limited to, the executable instructions. The memory can be implemented as one or more of a computer-readable medium or media, a volatile memory unit or units, or a non-volatile memory unit or units. An expansion memory may also be provided and connected to temperature monitoring device 100, that may include, for example, a SIMM (Single In-Line Memory Module) card, a micro SD card, and the like, and combinations thereof. In some implementations, such removable memory cards can be used to transfer temperature data collected by temperature monitoring device 100 to another computer or computer system for analysis or archival purposes. Such memory cards may also provide expansion memory for extra storage space for temperature monitoring device 100, or may also store applications or other information for the memory. The memory may include, for example, flash memory and/or NVRAM memory (non-volatile random access memory).

The executable instructions can be stored in the memory, the expansion memory, memory on the processor(s), or in a combination thereof. The executable instructions can include instructions that, when executed, perform functions related to the operating systems of temperature monitoring device 100 (e.g., operations of the user interface, coordination of intra-device module communications, coordination and control of applications run by temperature monitoring device 100, and so on). In addition, in some embodiments the executable instructions include instructions that, when executed, perform one or more of the functions and methods described elsewhere herein in relation to temperature monitoring, analysis of the monitored temperature data, alarming, and communications with other devices and systems. In some implementations, the executable instructions, or portions thereof, can be received in a propagated signal, for example, via an optional wireless interface of temperature monitoring device 100.

In some embodiments, temperature monitoring device 100 is configured for short-range wireless communication with another computer. For example, in some embodiments such communications may occur via communication modes such as, but not limited to, Bluetooth, WiFi, RFID, ANT+, NFC, or other such technologies.

In some embodiments, temperature monitoring device 100 includes one or more integral power sources (not visible). The power source(s) can provide the energy to operate temperature monitoring device 100. In some embodiments, the power source is one or more rechargeable batteries such as a nickel-metal hydride, lithium ion, lithium polymer, Hydrogen cell, Carbon Nanotube, Graphene, or zinc oxide battery. The rechargeable batteries may be recharged by electrically coupling an external power source to the battery, or to a battery charging circuit in temperature monitoring device 100 that is electrically connected to the power source. In some embodiments, the coupling of the external power source to temperature monitoring device 100 is via a wired connection, such as by plugging a cord into connector 112 located on housing 110. The coupling may also be accomplished in some embodiments by the use of a docking station with which temperature monitoring device 100 can mate to establish an electrical connection. In some such embodiments, the docking station includes an electrical connector that couples with a complementary electrical connector located on temperature monitoring device 100. For example, the electrical connector of the docking station can be a male connector and a corresponding female connector can be located on temperature monitoring device 100 (or vice versa). The electrical connection between temperature monitoring device 100 and the docking station can be used to transmit electrical energy to temperature monitoring device 100. The electrical energy can power the operations of temperature monitoring device 100, can recharge the on-board battery or batteries of temperature monitoring device 100, or a combination thereof.

In some embodiments, a docking station (or the like) can charge the on-board battery or batteries of temperature monitoring device 100 inductively (wirelessly). A primary coil that located within the docking station can receive AC from an on-board battery charging system. When temperature monitoring device 100 is physically close to the docking station a secondary electrical coil within temperature monitoring device 100 can receive inductive energy via an alternating magnetic field emanating from primary coil of the docking station. Alternating current is thereby induced in and transmitted from the internal coil of temperature monitoring device 100 to a battery charging circuit in temperature monitoring device 100. The battery charging circuit can rectify the alternating current to produce direct current that can be used to charge the battery or batteries of temperature monitoring device 100.

In the depicted embodiment, a display 130 is integral with housing 110. However, in some embodiments no such display 130 is included (but other user interface elements such as indicator lights, audible elements 124, and the like may be included alternately, or additionally when a display 130 is included). Display 130 provides visual information to a user. For example, in the depicted embodiment a current temperature 132 is prominently displayed. In some embodiments, current temperature 132 is updated (refreshed) each time temperature sensor 120 detects a new temperature value. In some embodiments, an averaging functionality (or other algorithm) may be used to determine current temperature 132 for display. In some such embodiments, the mode used to determine current temperature 132 for display is user selectable.

In the depicted example embodiment, display 130 also includes min/max temperature values 134. Min/max temperature values 134 can be the minimum temperature and the maximum temperature that temperature monitoring device 100 has detected since being reset. The display of min/max temperature values 134 can provide a clinician with an advantageous at-a-glance verification means for determining whether the sample has had a potentially detrimental temperature excursion. In addition, current time and date can be displayed 136 as well as a date of origin from when the sample was originally placed in the device 138.

In some embodiments, other information can be provided via display 130. For example, alarms or alert messages can be provided via display 130. User settings can be displayed in conjunction with a configuration mode of temperature monitoring device 100. Other information provided via display 130 can include, but is not limited to, historical temperature readings, a time duration of a temperature excursion, a battery charge level indication, a wireless signal strength indication, data transmission indication, an alpha-numeric sample ID, a status indicator, a warming indicator, and the like, and combinations thereof.

In some embodiments, one or more electrical button(s) 114 are coupled to housing 110. While in the depicted embodiment, a single electrical button 114 is included, in some embodiments two or more electrical buttons 114 are included. Electrical button(s) 114 can be used to facilitate user input to temperature monitoring device 100. In some embodiments, one or more menus can be accessed by interactions with electrical button(s) 114. In that manner, operations such as user configuration, data communications, resetting, restarting, and the like, can be initiated by a user of temperature monitoring device 100. In some embodiments, electrical button(s) 114 (as well as other elements of temperature monitoring device 100) are water-proof or water-resistant and configured for decontamination (and sterilization in some embodiments).

In some embodiments, temperature monitoring device 100 is equipped with a heating and cooling capability. That is, in some embodiments heat can be generated by temperature monitoring device 100 and transferred to a sample container within opening 116. In some such embodiments, the heating capability functions in concert with the temperature monitoring capability of temperature monitoring device 100 to modulate the temperature of the sample and to thereby maintain a target range of temperature of the sample. For example, in some cases a target temperature range for the storage of blood is about 36° C. to about 38° C. In such a case, when the temperature of the blood is detected by temperature sensor 120 as becoming close to the lower limit of 36° C., temperature monitoring device 100 may automatically delivery heat to the blood to maintain the blood's temperature above 36° C. Such heating and cooling capability may be facilitated by an integral heating device such as, but not limited to, electrical resistance heater(s), MEMS micro-heater(s), Peltier effect device(s), an infrared heater, an ultrasonic heater, or technology such as magnetic cooling or adiabatic spin entropy expansion, and the like. In some embodiments, temperature monitoring device 100 is equipped with a cooling capability 122.

Figure 3:
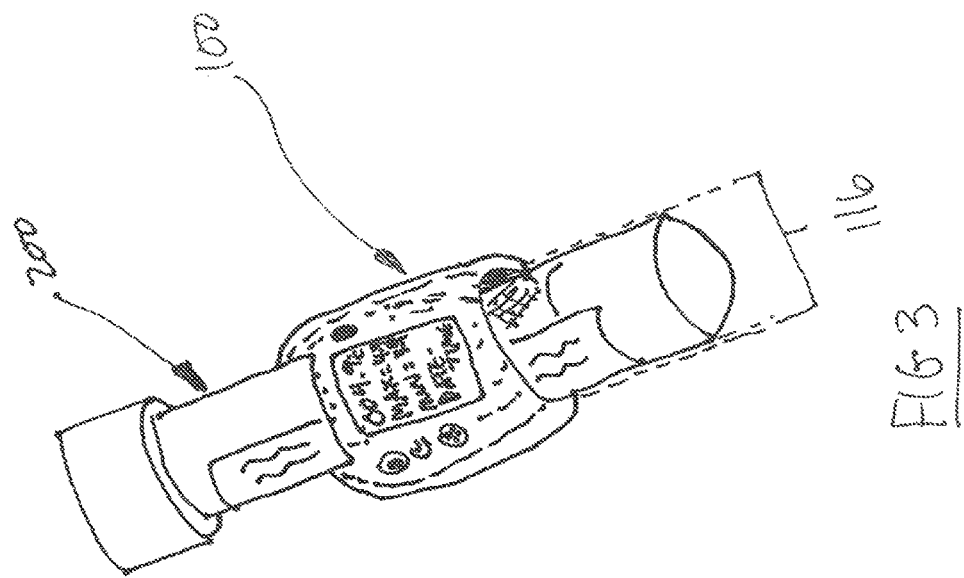
FIG. 3 is a perspective view of the temperature monitoring and maintenance device and phlebotomy tube of FIG. 2 in a coupled arrangement in accordance with some embodiments.
Figure 2:
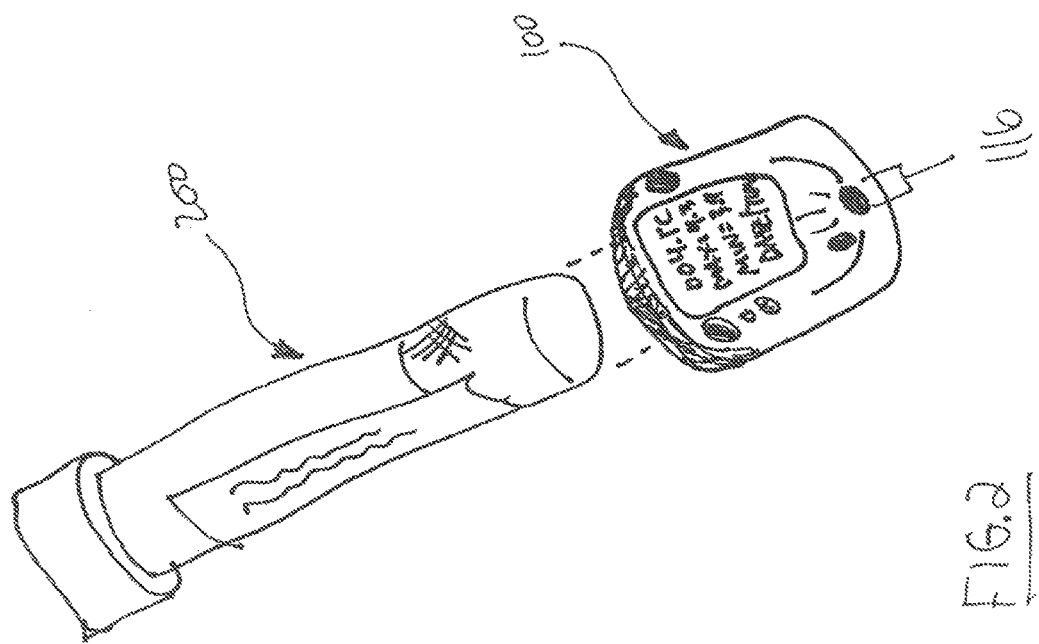
FIG. 2 is an exploded view of the temperature monitoring and maintenance device of FIG. 1 with a collapsed orifice and a phlebotomy tube.

Referring to FIGS. 2 and 3, the installation of temperature monitoring device 100 onto an example medical reservoir 200 is depicted. In the depicted embodiment, medical reservoir 200 is illustrated as a phlebotomy tube, but other types/forms/configurations or medical reservoirs may also be used for medical reservoir 200 (e.g., vials, test tubes, syringes, specimen containers, jars, bottles, collectors, a custom container, a standard container, and the like). Medical reservoir 200 may be made of various materials such as, but not limited to, plastic, metal, glass, composites, and the like. In some implementations, medical reservoir 200 may contain a blood sample. However, other fluids may be contained in medical reservoir 200. Such fluids can include other bodily fluids or other liquids such as medications, and the like.

In the depicted implementation, temperature monitoring device 100 is slid onto medical reservoir 200. In some embodiments, a light friction fit exists between medical reservoir 200 and temperature monitoring device 100. In some embodiments, a pliable element (e.g., an O-ring, leaf spring, barb, and the like) in opening 116 maintains a friction fit between medical reservoir 200 and temperature monitoring device 100. While in the depicted implementation, temperature monitoring device 100 is slid onto the mid-body portion of medical reservoir 200, temperature monitoring device 100 can be slidably disposed on any portion of medical reservoir 200. Using that feature, temperature monitoring device 100 can be located along the length of medical reservoir 200 in a location that is most effective for detecting the temperature of the contents of medical reservoir 200.

In some implementations, after use, temperature monitoring device 100 can be removed from medical reservoir 200 and temperature monitoring device 100 can be sanitized (and sterilized, e.g., in an autoclave, in some embodiments). Thereafter, temperature monitoring device 100 can be reset and reused in another implementation.

In an alternative embodiment, the functionality of temperature monitoring device 100 can be incorporated into a sample rack. That is, one or more temperature monitoring devices 100 (or adaptations thereof) can be installed into a sample rack that can receive medical reservoirs (e.g., phlebotomy tubes, test tubes, and the like). In some embodiments, this rack may replenish individual battery life for each individual unit. In some embodiments the rack has the ability to download data from all the vials or bottles and transmit it to a computer.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described herein as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described herein should not be understood as requiring such separation in all embodiments, and it should be understood that the described program components and systems can generally be integrated together in a single product or packaged into multiple products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A medical reservoir temperature monitoring and maintenance device comprising:
   a housing defining a flexible and expandable structure for selective coupling to a medical reservoir;
   a flexible temperature sensor coupled to the housing, the flexible temperature sensor configured and operable to measure a temperature of a material within the medical reservoir when the medical reservoir is coupled to the housing;
   a stretch sensor configured to detect when the bottle or vial of sample or product was first placed in the device and if it has ever since removed;
   a user interface coupled to the housing, the user interface including an alarm for notifying a user that the temperature sensor detected the temperature of the material to be outside of a predetermined range of acceptable temperatures and if the vial and the sample has ever been removed,
   a thermoelectric temperature control device coupled to the housing and configured to heat and cool the medical reservoir when the medical reservoir is located within the housing, and
   a connector configured as a communications port to notify individuals of the status of the reservoir remotely.

2. The medical reservoir temperature monitoring device of claim 1, wherein the structure defined by the housing for selective coupling to the medical reservoir is a cylindrical opening which is flexible and expandable.

3. The medical reservoir temperature monitoring device of claim 1, wherein the medical reservoir is a phlebotomy tube.

4. The medical reservoir temperature monitoring device of claim 2, wherein the temperature sensor comprises a plurality of temperature sensors located on an inner surface of the cylindrical opening.

5. The medical reservoir temperature monitoring device of claim 1, wherein the user interface includes a display.

6. The medical reservoir temperature monitoring device of claim 1, wherein the user interface includes one or more electrical buttons.

7. The medical reservoir temperature monitoring device of claim 1, the connector further configured as an electrical connector coupled to the housing.

8. The medical reservoir temperature monitoring device of claim 1, wherein the medical reservoir temperature monitoring device is configured and operable to wirelessly communicate with a separate computer or device.

9. The medical reservoir temperature monitoring device of claim 1, wherein the stretch sensor is configured to detect every instance the sample or product is accessed.

10. The medical reservoir temperature monitoring device of claim 1, further comprising:
a processor within the housing and in communication with the temperature sensor and the thermoelectric temperature control device, the processor configured to:
receive the temperature of the material within the medical reservoir from the temperature sensor; and
operate the thermoelectric temperature control device to heat and cool the medical reservoir based on the temperature of the material within the medical reservoir.

11. The medical reservoir temperature monitoring device of claim 10, further comprising:
a second temperature sensor configured to measure an exterior temperature, wherein the processor is configured to receive the exterior temperature from the second temperature sensor for determining whether the medical reservoir requires heating or cooling.

12. A method for monitoring a temperature of contents of a medical reservoir with a data log and a chain of custody, the method comprising:
coupling a housing of a medical reservoir temperature monitoring device to the medical reservoir;
detecting, using a stretch sensor secured to the housing whether there has been removal of the medical reservoir from the housing;
measuring, using a temperature sensor coupled to the housing, a temperature of a material within the medical reservoir when the medical reservoir is coupled to the housing; and
displaying an alarm on a user interface coupled to the housing, when the temperature sensor determines the temperature of the material to be outside of a predetermined range of acceptable temperatures;
storing, on a periodic time interval basis, temperature values from the temperature sensor in memory that is coupled to the housing;
providing, based on the temperature values, temperature information via the user interface; and
heating or cooling, based on the temperature values, the medical reservoir using a thermoelectric temperature control device coupled to the housing.

13. The method of claim 12, wherein the time interval is within a range between 10 microseconds and 5 minutes.

14. The method of claim 13, wherein the temperature information comprises an alarm.

15. The method of claim 13, wherein the stretch or change in pressure information comprises an alarm.

16. The method of claim 13, further comprising transmitting the stored temperature values.

17. The method of claim 13, further comprising transmitting the stored temperature values via the internet.

18. The method of claim 13 wherein the transmitting is performed wirelessly.

19. The method of claim 13, wherein the user interface includes a display and temperature values measured by the temperature sensor are indicated on the display.

20. The method of claim 13, further comprising heating or cooling, by the medical reservoir temperature monitoring device, the material within the medical reservoir, wherein the heating or cooling is initiated based on the temperature values.

* * * * *

UNITED STATES PATENT AND TRADEMARK OFFICE
CERTIFICATE OF CORRECTION

PATENT NO. : 10,383,791 B2
APPLICATION NO. : 15/279704
DATED : August 20, 2019
INVENTOR(S) : Stephen Joseph Scully, Jr.

Page 1 of 1

It is certified that error appears in the above-identified patent and that said Letters Patent is hereby corrected as shown below:

On the Title Page

In item (71), in "Applicant", in Column 1, Line 2, delete "NY" and insert --MN-- therefor Signed and Sealed this
Second Day of June, 2020

Andrei Iancu
*Director of the United States Patent and Trademark Office*